United States Patent [19]

Carr et al.

[11] 4,363,449
[45] Dec. 14, 1982

[54] PROCESS FOR RECLAIMING JELLY-FILLED TELECOMMUNICATION CABLES

[75] Inventors: Susan H. Carr, Mercer; Monique A. Schobert, Hunterdon, both of N.J.; John J. Taylor, Lexington, S.C.

[73] Assignees: Western Electric Co., Inc., New York; Nassau Recycle Corporation, Staten Island, both of N.Y.

[21] Appl. No.: 222,438

[22] Filed: Jan. 5, 1981

[51] Int. Cl.³ .............................................. B02C 19/00
[52] U.S. Cl. ....................................... 241/21; 241/23; 241/24
[58] Field of Search ...................... 260/2.3; 241/25, 2, 241/3, 14, 21, 16, 23, 24, 29

[56] References Cited

U.S. PATENT DOCUMENTS

| | | | |
|---|---|---|---|
| 1,880,372 | 10/1932 | Bull . | |
| 2,954,122 | 9/1960 | Colburn | 209/8 X |
| 3,074,653 | 1/1963 | Schorsch | 241/14 |
| 3,516,841 | 6/1970 | Haverman | 241/14 X |
| 3,606,176 | 9/1971 | Vodic | 241/20 |
| 3,697,003 | 10/1972 | Grant et al. | 241/24 |
| 3,705,694 | 12/1972 | Slocum | 241/14 |
| 3,749,322 | 7/1973 | Reynolds | 241/14 X |
| 4,036,441 | 7/1977 | Basten et al. | 241/24 X |

FOREIGN PATENT DOCUMENTS 1382825 2/1975 United Kingdom .

Primary Examiner—Mark Rosenbaum
Attorney, Agent, or Firm—Robert B. Kennedy

[57] ABSTRACT

A process is disclosed for reclaiming a jelly-filled telecommunication cable. The process comprises the steps of cutting the cable into segments of jelly bearing insulated wires and forming the segments into a slurry heated to a temperature sufficient to soften the jelly. The slurry is milled thereby liberating insulation from the wires with a substantial portion of the softened jelly adhering to the liberated insulation. The jelly-bearing liberated insulation is then separated from the wires.

7 Claims, 2 Drawing Figures

PROCESS FOR RECLAIMING JELLY-FILLED TELECOMMUNICATION CABLES

TECHNICAL FIELD

This invention relates to processes for reclaiming telecommunication cables of the type that are filled with jelly or jelly-like substances as a waterproofing measure.

BACKGROUND OF THE INVENTION

Telecommunication cables of the waterproof type are today coming into wide-spread use. As often in the case of non-waterproof cables, atactic polypropylene flooding compound is applied between their protective sheathes about the cable core to inhibit entry of water. With waterproof cables however the cable core itself is also filled with a jelly-like substance such as petroleum jelly or an extended thermoplastic rubber. This latter material, commonly referred to as a filling compound, is usually present in a much larger quantity than the flooding compound. It serves to inhibit migration along the core of any water which has managed to enter the cable core notwithstanding the presence of the flooding compound.

The abundant presence of such sticky, jelly-like filling compound has inhibited reclamation of waterproof cables. Telecommunication cables manufactured without jelly core may be reclaimed through the use of choppers or granulators and air gravity tables. These devices respectively liberate plastic insulation from the metallic conductors of the cable core and separate the cable sheathing and conductors from each other and from the liberated insulation. However, cables manufactured with jelly severely restrict both liberation and separation of the components since the jelly tends to adhere the various constituents together and to the processing equipment. For example, where the material is processed through a series of granulators with progressively smaller size grates, those grates with openings of less than one inch rapidly become fouled with the jelly.

Recently, efforts have been made to devise a system for reclaiming jelly filled telecommunication cables. One such approach has been the addition of a dry agent such as clay to absorb the jelly and form a mass of dry particles that may be reclaimed as before by chopping and air gravity table separation. Unfortunately, this approach has been impractical and cost inefficient due to the need for another material merely to serve as a transport medium in the reclamation process. The presence of clay has also created dust pollution and equipment wear. The use of solvent baths has also been tried but has not proven to be commercially feasible due to solvent loss and redistillation requirements. Steam showering has been tried too but found to be of insufficient effectiveness. The use of pyrolysis and incineration techniques, although possessing technical possibilities, require excessively high capital outlays for commercialization.

Accordingly, there remains a need to provide an effective yet cost efficient process for reclaiming telecommunication cables of the type that includes a jelly-like substance. It is to this task which the present invention is primarily directed.

SUMMARY OF THE INVENTION

In one preferred form of the invention a process is provided for reclaiming a jelly-filled telecommunication cable. The process comprises the steps of cutting the cable into segments of jelly bearing insulated wires and forming the segments into a slurry heated to a temperature sufficient to soften the jelly. The slurry is milled thereby liberating insulation from the wires with a substantial portion of the softened jelly adhering to the liberated insulation. The jelly-bearing liberated insulation is then separated from the wires.

DESCRIPTION OF THE PREFERRED EMBODIMENT

In reclaiming waterproof cable the cable jacket, usually formed of low density polyethylene, is first stripped from the cable core. As this is done most of the thermoplastic flooding compound usually present between the core and jacket is also peeled off. This exposes the jelly-filled cable core which typically is composed of a number of plastic insulated copper wires held in a bundle by a plastic, cord-like binder covered with a plastic core wrap and sheathed with corrugated aluminum or steel or both.

The lengths of scrap cores typically vary anywhere from a few feet to several hundred feet while their diameters vary from some ½ to 3 inches. In view of this it is necessary to shear and then chop the cable into small segments of generally uniform size. The chopping operation is preferably done with a conventional granulator such as those sold by Triple/S Dynamics of Dallas, Tex. until segments pass through a 1½ inch grate. The segments forced through the grate are comprised of copper wires covered with polyethylene plastic insulation measuring some 1¼ inches in length on the average and less than 1/16 inch in diameter. These are randomly coated with the petroleum jelly. The relatively large openings in the grate prevent it from becoming fouled with the jelly. Passage through the granulator liberates some of the plastic insulation from the wires as before.

After the cable segments have passed through the grate they are mixed with hot water into a slurry and milled or ground as with a Sprout-Waldron single disc mill type thermomechanical refiner. The water, which preferably is heated to some 90° C., is introduced into the refiner through a feed line independent from that of the cable segments. As a result, formation of the slurry occurs just as the milling operation by the refiner commences. The milling itself then assists in further mixing of the water and cable segments.

The Sprout-Waldron thermomechanical refiner employs two vertically oriented, teeth-bearing discs positioned closely adjacent one another. One disc is stationary while the other is rotated by a 250 HP motor at some 1800 RPM. The gap between the teeth bearing milling faces of the discs is adjustable whereby it may be set at less than the diameter of the insulated wire segments but greater than the wire diameter. With this spacing the refiner has been found to liberate the insulation from the wires rather than solely effect a conventional milling or grinding operation.

Figure 1:
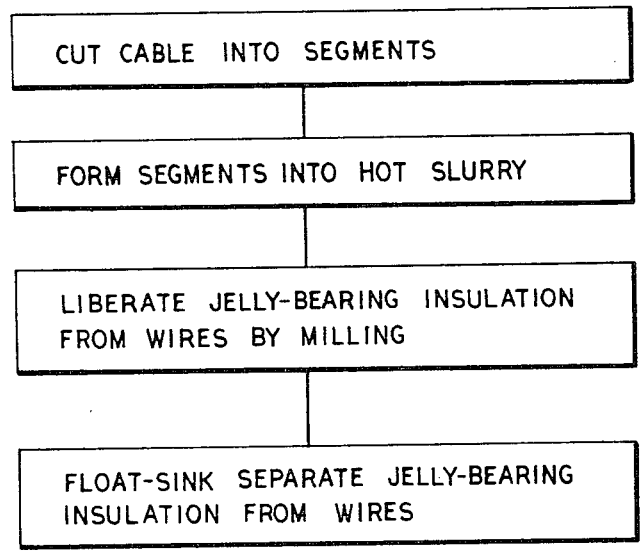
FIG. 1 is a block diagram of the steps of the invented process in one preferred form.
Figure 2:
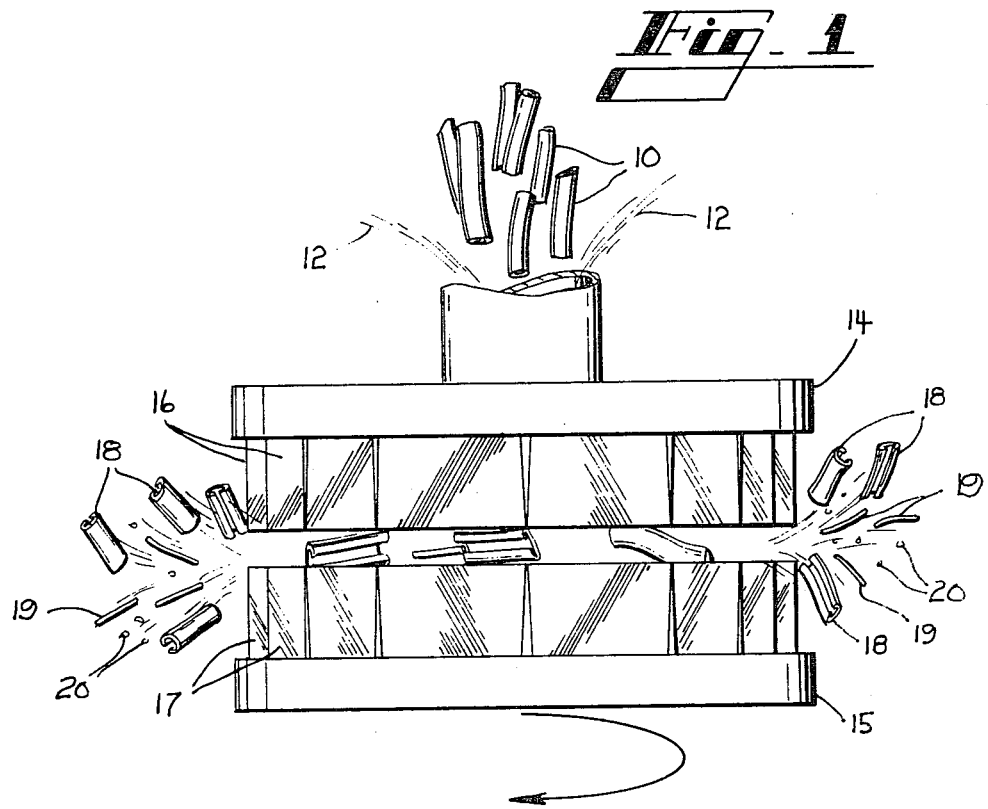
FIG. 2 is a schematic representation of the third step of the process diagrammed in FIG. 1.

The liberation effect created by milling may be understood better by reference to FIG. 2 of the drawing. Here cable segments 10 and hot water 12 are seen to be fed into the refiner so as to form a confluence at the center of a stationary disc 14 and rotating disc 15. From here the mixture is forced to travel to the periphery of the discs. Due to the small clearance between the teeth 16 of disc 14 and the teeth 17 of the disc 15, and to the centrifugal forces present, the segments experience forces which shear the plastic insulation 18 and liberate it from the metallic wires 19. A size reduction also occurs to most of the materials. In the presence of the hot water some of the petroleum jelly is completely freed from the segments and flows out from the discs suspended in the water. However, for purposes of illustration the free jelly is schematically shown in FIG. 2 as globules 20. The balance of the jelly, softened in the presence of the hot water, tends to adhere to the sheared strips of insulation 18. Some jelly will sometimes remain on the wires but not so much as to adversely effect subsequent metal processing and recasting operations. It is believed that the affinity of the jelly to be liberated insulation is due to the composition and texture of the polyethylene insulation surface.

The gap or spacing between the sets of teeth 16 and 17 has been found to be quite important with a gap of 15 mils being preferred for the size of wires previously mentioned. If the gap is made too wide the liberation effectiveness decreases while too small a gap reduces yield.

After the materials exit the thermomechanical refiner they are pumped to a materials separator, such as a Wemco Model 1500 hydrocyclone, where the metallic wires are separated from the insulation and jelly due to the difference in their specific gravities. In hydrocyclones fluid pressure creates rotational fluid motion which causes relative movement of the particles mixed or suspended in the fluid thereby separating them. The rotating fluid is forced to spin towards the cyclone center and then upward through a vortex finder to escape. As a result each particle in the fluid is affected by two opposite forces, namely an outward radial force due to centrifugal acceleration and an inward radial force due to the drag of the inwardly moving fluid. The relatively light insulation and jelly or "floats" yield to the fluid drag to become discharged through the vortex finder while the heavier wires or "sinks" yield to the centrifugal forces to become discharged through the apex orifice at the bottom of the cyclone. Preferably, the slurry is also maintained at 90° C. throughout separation to keep the petroleum jelly liquid and flowing.

Following separation the wires are screened as through a 8 mesh screen. Those wires not passing through the screen, which normally are those still bearing insulation, are recycled to the thermomechanical refiner for further liberation and size reduction while those passing through the screen are conveyed under a magnet to remove the steel content. The remaining aluminum and copper is then separated by a conventional destoner employing an oscillating, inclined vibrating table. Finally, the water is discharged or treated for reuse as by filtration or floatation to remove the jelly and impurities.

One evaluation of the process found that 47.5% of the copper wires were liberated by granulation. An initial milling run increased this yield to 69.1%. With recycling an ultimate sink yield of 99.8% wire was measured from the hydrocyclone. These results may, of course, vary depending upon such matter as the sharpness of the granulator blades, the type and size of cable being processed, the spacing between the mill discs and the screen sizes.

It thus is seen that a new process is provided for reclaiming jelly-filled telecommunication cables. The process has been found to be suprisingly effective and cost efficient. It should, however, be understood that the process as described in detail merely illustrates principles of the invention in one preferred form. Many modifications, additions and deletions may be made thereto without departure from the spirit and scope of the invention as set forth in the following claims.

What is claimed is:

1. A process for reclaiming a jelly-filled telecommunication cable comprising the steps of:
    (a) cutting the cable into segments of jelly-bearing insulated wires;
    (b) forming a slurry of the segments heated to a temperature sufficient to soften the jelly;
    (c) milling the slurry in a manner so as to shear and thereby liberate insulation from the wires with a substantial portion of the softened jelly adhering to the liberated insulation; and
    (d) separating the jelly-bearing liberated insulation from the wires.

2. A process for reclaiming cable in accordance with claim 1 wherein step (b) water is mixed with the segments in forming the slurry.

3. A process for reclaiming cable in accordance with claim 2 wherein at least a portion of step (b) is conducted substantially simultaneously with step (c).

4. A process for reclaiming cable in accordance with claim 1 wherein step (c) the slurry is passed between a pair of discs while one disc is being rotated with respect to the other.

5. A process for reclaiming cable in accordance with claim 1 wherein step (d) the jelly-bearing liberated insulation is separated from the wires by floatation of the insulation and sinkage of the wires in the slurry.

6. A process for reclaiming cable in accordance with claim 5 where step (d) the jelly-bearing liberated insulation is separated form the wires by wet cycloning.

7. A process for reclaiming cable in accordance with claim 6 wherein step (c) the slurry is milled at a milling station and wherein step (d) the jelly-bearing insulation is separated from the wires at a wet cycloning station and wherein between steps (c) and (d) the liberated insulation and wires containing slurry is pumped from the milling station to the cycloning station.

* * * * *